Aug. 23, 1955  D. R. HUGHSON  2,715,779
MACHINIST'S CALCULATOR
Filed June 15, 1953
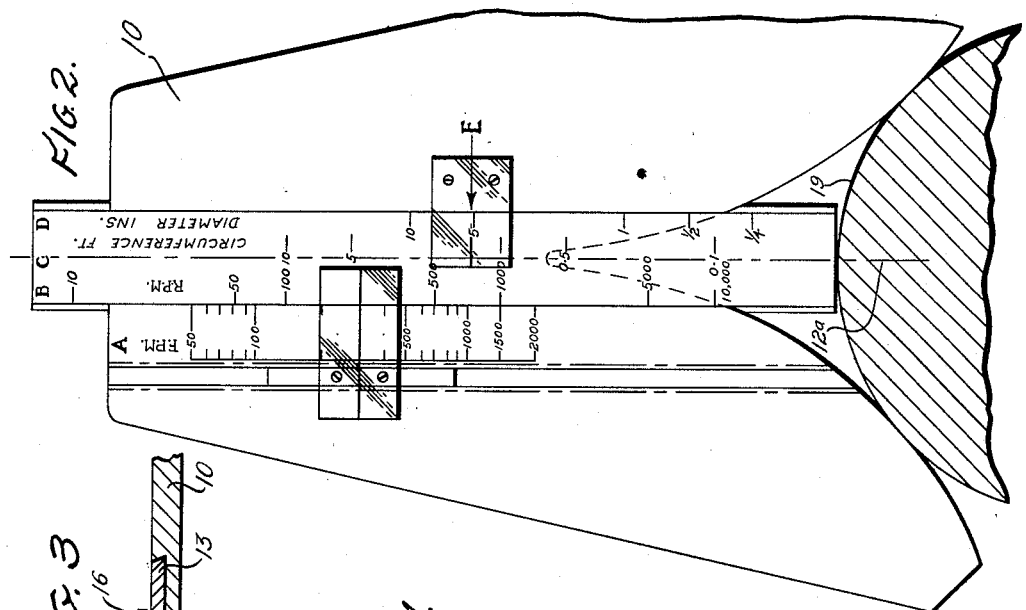
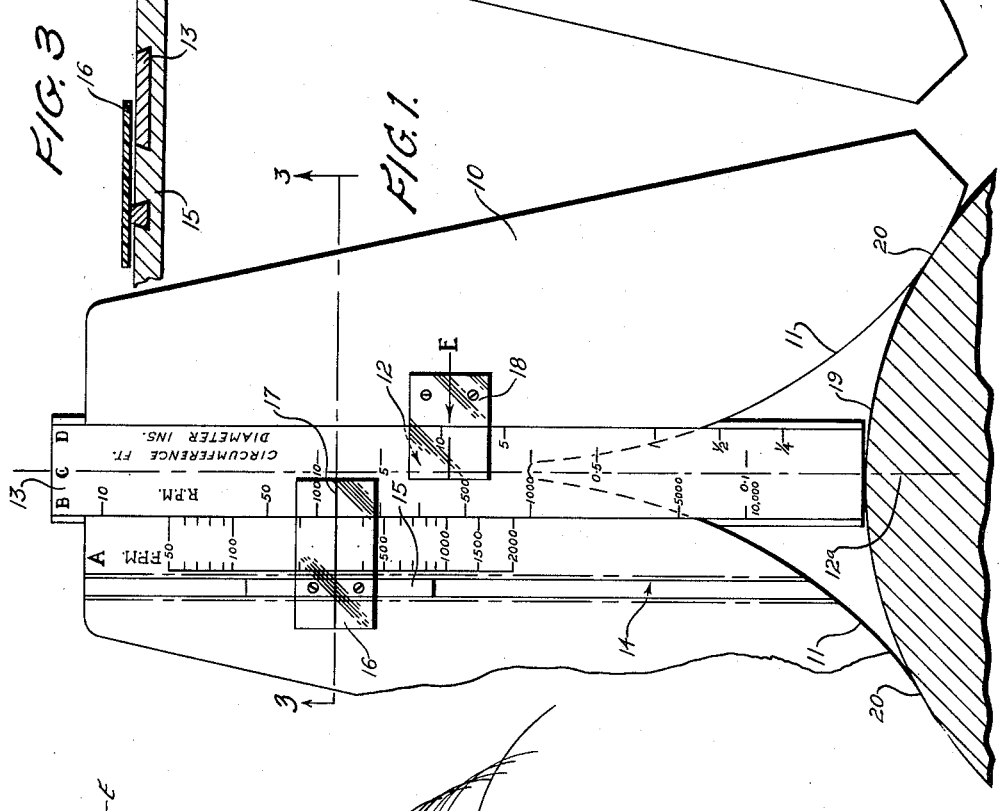
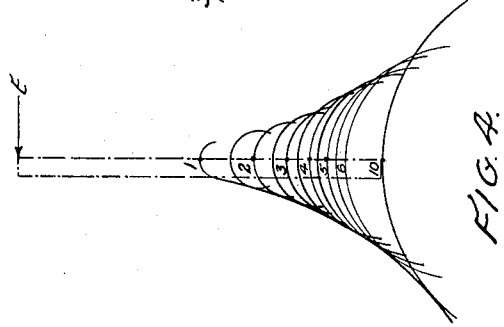
Inventor
DAVID R. HUGHSON
by: Fetherstonhaugh & Co.
Attys.

United States Patent Office 2,715,779
Patented Aug. 23, 1955

2,715,779

MACHINIST'S CALCULATOR

David R. Hughson, Ottawa, Ontario, Canada

Application June 15, 1953, Serial No. 361,760

8 Claims. (Cl. 33—178)

This invention relates to a calculator for determining the revolutions per minute at which a workpiece must be rotated in a lathe or like device to obtain a desired cutting speed and more specifically such a calculator operable by engagement with the workpiece.

In lathework, there is generally an ideal speed at which the workpiece should be rotated to produce the correct cutting speed. This ideal cutting speed is dependant upon the material being cut, the type of cutting tool employed, the depth of cut and the type of finish required. It is therefore advantageous to know the ideal revolutions per minute so that machining time will not be wasted due to too low a speed, and on the other hand, so that neither the work nor the cutting tool will be damaged due to excessive speed. However, during the process of machining work of cylindrical cross-section, the diameter of the work is reduced by twice the depth of the cut of each revolution. This significantly reduces the circumference of the work, and would therefore permit a greater R. P. M. in order to maintain the ideal cutting speed.

It is a particular object of this invention to provide a machinist's calculator which may be adjusted according to the required ideal cutting speed, and merely touched to the workpiece in order to determine the corresponding ideal R. P. M. at any diameter to which the workpiece has been machined.

It is a further object of this invention to provide a calculator as before, of a comparatively simple and sturdy construction, which may also be used to determine the diameter and circumference of the work at any stage by merely touching it to the work.

With these and other objects in view, the invention generally comprises a calculator in the form of a plate-like body presenting workpiece engaging edge contours in the form of two symmetrical diverging curves, a cursor which can be pre-set, and a sliding scale which is adapted to be movable by and in relation to the said edge contours of the body when the plane of the calculator is disposed at right angles to the axis of rotation of the workpiece, and the calculator is touched to the workpiece at one point on each of the symmetrical curves and the slidable scale is moved to touch the workpiece at a point between said points.

Other objects of the invention will be appreciated from a study of the following specification taken in conjunction with the accompanying drawings.

In the drawings:

Figures 1 and 2 show two plan views of the calculator applied to workpieces of different diameters;

Figure 3 is a cross-sectional view of the calculator along section 3—3 in Figure 1;

Figure 4 illustrates the method of plotting the diverging curves of the calculator.

In Figure 1, the calculator comprises a body 10 consisting of a plate shaped symmetrically in curves at 11. The plate 10 has cut in it a slot 12 within which moves slide 13, along the center line or axis of symmetry 12a. On the face of the body 10 are etched or otherwise marked, the logarithmic scale "A," denoting feet per minute of cutting speed and the index mark "E." The slide 13 is provided with three logarithmic scales, "B," "C" and "D," denoting revolutions per minute, circumference in feet and diameter in inches, as indicated.

The body 10 has cut in it a further slot-like guideway 14, to one side of the axis of symmetry 12a and parallel to it and slidably carrying the slide 15. Attached to the slide 15 is a transparent cursor 16, which is so placed on the slide 15 that it overlaps scales "A" and "B." Etched on the cursor 16 is the index 17. The fixed marker 18 is attached to the body 10 and overlaps scales "C" and "D" and has the index "E" etched on it.

Figure 2 shows a similar plan view of the calculator, but applied to a workpiece of smaller diameter to show how the proper positioning of slide 15 may be effected.

Figure 3 shows in the cross-section along sections 3—3 of Figure 1, the arrangement of the slides 13 and 15, and the cursor 16, on the body 10.

In operation, when the correct cutting speed has been decided upon, the index 17 is set opposite this cutting speed in scale "A." The calculator is then set on the workpiece 19 with its body in a plane at right angles to the axis of rotation of the workpiece, in such a manner that it engages the latter at a point 20 on the symmetrical curves 11 and also at a point on the bottom of the slide 13, as shown in Figures 1 and 2. Thus, the position of the slide 13 relative to scale "A," is determined by the diameter of the workpiece and the number appearing on scale "B," under the index 17 on the cursor 16, will give the required revolutions per minute at which the work should be rotated to cut at the ideal rate.

If it is merely desired to measure the diameter of the work, the calculator is applied to the work as before, but there is no need to set the cursor 16 as the diameter may be read from the index "E," on scale "D" and the circumference may be determined from the corresponding reading on scale "C."

The operating principle of the calculator is based on the fact that since only one circle can pass through any three given points, the slide 13 is caused to move in relation to the diameter and hence to the circumference of the workpiece. The curve 11 is plotted as shown in Figure 4.

The datum point E and the minimum work piece diameter are arbitrarily selected. Here the minimum diameter is 1 centimetre. The logarithmic scale cycle length L is also arbitrarily selected. Once the logarithmic cycle length is selected for scale D the same cycle length is necessary for scales A and B although scale B is inverse relative to the other scales. For comparison of arbitrarily selected cycle length reference may be had to Figures 1 and 2 and to the length, for instance, 0.5 to 5 on scale C, 100 to 1,000 on scale B or 60 to 600 on scale A. The distances on the logarithmic scale are laid out from an arbitrarily selected point P with the marking for increasing diameters increasing in the direction of the work piece's intended location. Such diameter markings are indicated in Figure 4 as 1, 2, 3, 4, etc. The arc of diameter 1 length unit is drawn with the arc passing through the diameter marking 1 and with the centre of the arc of the axis of symmetry 12a. Similar arcs of diameter 2, 3, 4, etc. are drawn through diameter markings 1, 2, 3, 4, etc. respectively. The result is an envelope of curves from which the curves forming the common tangent to all said circles, may be drawn. Such a curve above and below the axis of symmetry delineates the edges 11.

Then if the slider 13 is designed with its logarithmic scale marking 1 opposite index E, the length of the slider extending toward the work piece is that which will make the contact surface of the slider a tangent to arc 1.

The remainder of scale D may be carried out by analogy to Figures 1 and 3.

It will be noted that scales A and B are juxtaposed and that the F. P. M. scale and R. P. M. scale markings run to the bordering edge. Thus the reading from scale to scale might be made without cursor 16. Thus the cursor although providing for visual convenience is not absolutely essential to the invention.

It will be apparent, however, that many modifications can be made in the specific manner of mounting of slides and scales without departing from the spirit of this invention.

What I claim as my invention is:

1. A machinist's calculator comprising in combination: a body carrying a logarithmic scale designating cutting speeds; diverging symmetrical curves providing engaging surfaces on said body adapted to engage at two points the circumferential surface of a workpiece and formed on the locus of the common tangent of all circles engageable by said surfaces; a slide having an engaging end slidably mounted in said body and movable parallel to said scale, and in a direction equidistant from said surfaces and toward the workpiece to engage a circumferential surface thereof at a third point; a speed scale calibrated in revolutions per unit of time arranged logarithmically on said slide and a cursor slidable in said body including means extending over both said scales whereby corresponding positions on said scales may be visually located by an operator.

2. A calculator as claimed in claim 1, and a diameter scale arranged logarithmically on said slide parallel to the motion thereof, and an indicator on said body located to show on said diameter scale the diameter of a workpiece engaged by said engaging surfaces and the engaging end of said slide.

3. A calculator as claimed in claim 1, including a circumference scale conforming in dimensional system to the cutting speed scale and arranged logarithmically.

4. A calculator as claimed in claim 1, wherein the engaging surfaces are defined in proportion to the unit of measurement upon which the logarithmic scales are based.

5. A machinist's calculator, comprising: a body with two diverging symmetrical curved edges separated by a theoretical line of symmetry and defined by the envelope of the common tangents of all circles engageable by said surface, and diverging for engagement with the circumferential surface of a workpiece at two points equidistant from said line of symmetry; a slide mounted along the axis of symmetry of said body and parallel thereto; an engaging end on said slide engageable with the circumference of said workpiece at a third point equidistant from said first mentioned points of engagement, upon projection of the slide from said body; a scale upon said body and a scale upon said slide; and a cursor means slidable parallel to and extending over said scales, whereby corresponding readings on said scales may be determined.

6. A calculator as claimed in claim 5 wherein said slide has a plurality of scales thereon, and a marker means fixedly attached to the body, and extending over said scales, independently of said first mentioned cursor means.

7. A machinist's calculator comprising in combination: a body carrying a logarithmic scale designating cutting speeds; diverging symmetrical curves providing engaging surfaces on said body adapted to engage at two points the circumferential surface of a workpiece and formed on the locus of the common tangent of all circles engageable by said surfaces; a slide having an engaging end slidably mounted in said body and movable parallel to said scale, and in a direction equidistant from said surfaces and toward the workpiece to engage a circumferential surface thereof at a third point; and a speed scale calibrated in revolutions per unit of time arranged logarithmically on said slide said scale designations and said scale calibrations being juxtaposed.

8. A machinist's calculator, comprising; a body with two diverging symmetrical curved edges separated by a theoretical line of symmetry and defined by the envelope of the common tangents of all circles engageable by said surface, and diverging for engagement with the circumferential surface of a workpiece at two points equidistant from said line of symmetry; a slide mounted along the axis of symmetry of said body and parallel thereto; an engaging end on said slide engageable with the circumference of said workpiece at a third point equidistant from said first mentioned points of engagement, upon projection of the slide from said body; and a scale upon said body and a scale upon said slide; the respective scale markings being juxtaposed, whereby corresponding readings on said scales may be determined.

References Cited in the file of this patent

UNITED STATES PATENTS

| 1,969,296 | De Valle Arizpe | Aug. 7, 1934 |

FOREIGN PATENTS

| 6,566 | Great Britain | Mar. 17, 1913 |
| 156,787 | Switzerland | Nov. 1, 1932 |

OTHER REFERENCES

"The Elements of the Differential and Integral Calculus," pages 208–216, by W. A. Granville, published by the Ginn & Co. of N. Y. in 1904.